Aug. 25, 1936.  J. VETROSKY  2,052,505
KITCHEN UTENSIL
Filed April 4, 1936
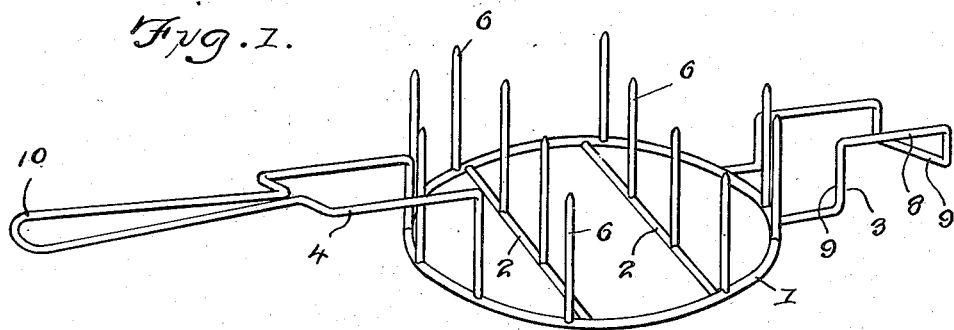
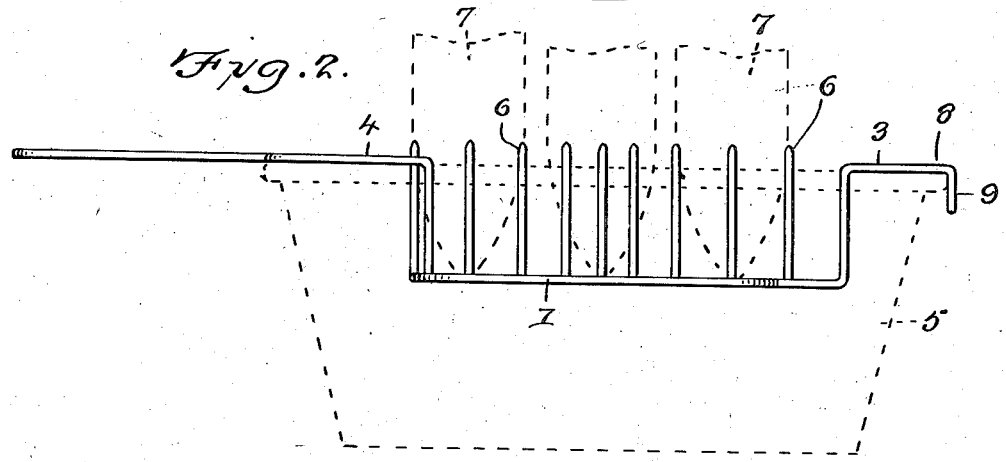
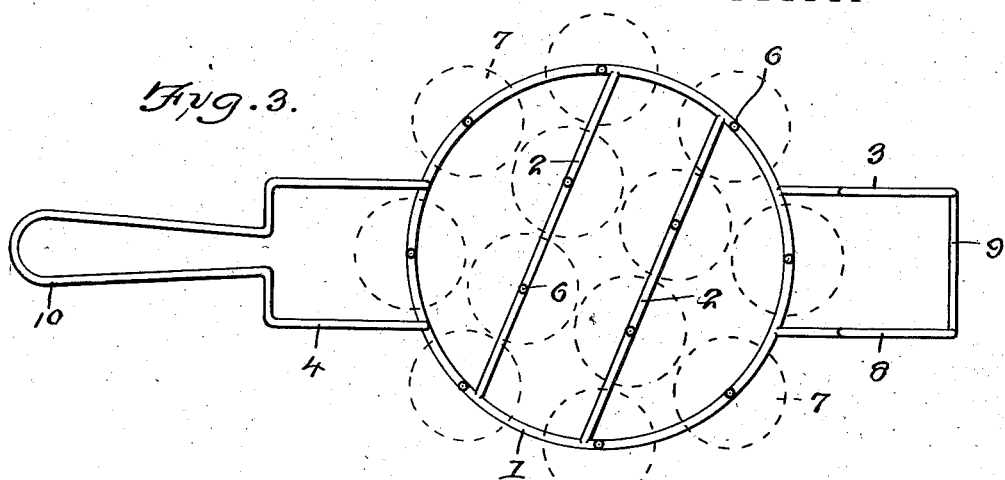
Joseph Vetrosky
INVENTOR
BY Victor J. Evans & Co.
ATTORNEY Patented Aug. 25, 1936

2,052,505

UNITED STATES PATENT OFFICE 2,052,505

KITCHEN UTENSIL

Joseph Vetrosky, Bethlehem, Pa.

Application April 4, 1936, Serial No. 72,803

2 Claims. (Cl. 53—5)

This invention relates to kitchen utensils and more particularly to a rack and has for the primary object the provision of a simple and inexpensive device of this character which may be readily adapted to a utensil employed for boiling frankfurters to support rolls used in making sandwiches from the frankfurters so that said rolls will be steamed at the same time of the cooking of the frankfurters which besides heating the rolls, also gives them a desired flavor.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a perspective view illustrating a utensil constructed in accordance with my invention.

Figure 2 is a side elevation showing a device adapted to a pan or similar device and supporting the rolls in vertical position.

Figure 3 is a top plan view illustrating the utensil.

Referring in detail to the drawing, the numeral 1 indicates an annular body having connected thereto spaced bars 2 and also supporting brackets 3 and 4 adapted to engage with opposite edges of a receptacle 5, as shown in Figure 2, for supporting the body and bars well within the receptacle. Secured to and extending vertically from the body 1 and the bars 2 are spaced pins 6 on which may be impaled rolls 7 so that said rolls will be supported vertically and spaced from each other for the purpose of being steamed by boiling water in the receptacle 5. This water also may be employed for cooking sausages or frankfurters so that the vapors passing from the water will contact the rolls to heat them and give them a desired flavor. The bracket 3 has an offset portion 8 to rest on an edge of the receptacle and also defining spaced flanged portions 9. The bracket 4 includes angularly related portions one of which is to rest on an edge of the receptacle and is extended to form a handle 10 so that the device may be readily placed on and removed from the receptacle.

Having described the invention, I claim:

1. A utensil comprising a body of skeleton formation, impaling pins formed on said body, means carried by said body to engage with opposite edges of a receptacle, one of said means being extended to form a handle and the other means including spaced parallel flanged portions, one of which being disposed within the receptacle and the other being disposed outwardly of said receptacle.

2. A utensil comprising an annular body, bars connected with said body, impaling pins formed on said body and bars, brackets formed on said body at opposite sides thereof to rest on opposite edges of a receptacle positioning the body well within the receptacle with one of the brackets extending downwardly inside and outside of said receptacle, and a handle formed on one of said brackets.

JOSEPH VETROSKY.